United States Patent
Hromi et al.

(10) Patent No.: US 8,943,568 B1
(45) Date of Patent: Jan. 27, 2015

(54) SECURE VIDEO CONFERENCING TO CONDUCT FINANCIAL TRANSACTIONS

(71) Applicant: FMR LLC, Boston, MA (US)

(72) Inventors: Jonathan Hromi, Watertown, MA (US); John C. McDonough, Nahant, MA (US); Dmitry Bisikalo, Framingham, MA (US); Hadley Rupert Stern, West Newton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/224,881

(22) Filed: Mar. 25, 2014

(51) Int. Cl.
*H04L 29/06* (2006.01)
*H04N 7/15* (2006.01)

(52) U.S. Cl.
CPC . *H04L 63/08* (2013.01); *H04N 7/15* (2013.01)
USPC .................................. 726/7; 726/26; 726/27

(58) Field of Classification Search
CPC ....... G07F 19/201; G07F 19/20; H04L 63/08; H04N 7/15
USPC .............................. 726/7, 26, 27; 348/211.12
See application file for complete search history.

(56) References Cited

U.S. PATENT DOCUMENTS

| 6,552,850 | B1 * | 4/2003 | Dudasik ................... 359/486.02 |
| 2001/0054071 | A1 | 12/2001 | Loeb |
| 2002/0029350 | A1 * | 3/2002 | Cooper et al. ................ 713/200 |
| 2003/0070072 | A1 | 4/2003 | Nassiri |
| 2004/0169722 | A1 * | 9/2004 | Pena .......................... 348/14.01 |
| 2010/0205667 | A1 * | 8/2010 | Anderson et al. ............... 726/19 |
| 2013/0282446 | A1 * | 10/2013 | Dobell ......................... 705/7.42 |
| 2013/0321562 | A1 * | 12/2013 | Takahashi .................. 348/14.06 |
| 2014/0104371 | A1 * | 4/2014 | Calman et al. ............. 348/14.08 |

* cited by examiner

*Primary Examiner* — Carl Colin
*Assistant Examiner* — Don Zhao
(74) *Attorney, Agent, or Firm* — Proskauer Rose LLP

(57) ABSTRACT

Methods and apparatuses, including computer program products, are described for secure video conferencing to conduct financial transactions. A server computing device receives a request to establish a video conference from a first client device associated with a user of the first client device. The server computing device authenticates the first client device using credential information. The server computing device establishes a video conference between the first client device and a second client device associated with a customer representative of a financial institution. The server computing device transmits video images associated with one or more cameras coupled to the first client device to the second client device, the video images comprising a view of the user and an area surrounding the user. The server computing device determines whether any persons other than the user are present in the area surrounding the user.

25 Claims, 6 Drawing Sheets

SECURE VIDEO CONFERENCING TO CONDUCT FINANCIAL TRANSACTIONS

FIELD OF THE INVENTION

This application relates generally to methods and apparatuses, including computer program products, for secure video conferencing to conduct financial transactions.

BACKGROUND

Because persons making certain types of sensitive financial or legal transactions can be subject to duress and undue influence, it is important to ensure that such decision-makers are competent and acting of their own free will when communicating with others, such as financial advisors and lawyers. Typically, these sensitive transactions are consummated in the presence of the advisor during a face-to-face meeting, where the advisor can ensure an optimal environment for the decision-maker to provide instructions to his or her advisor and reduce or eliminate the threat of tainted judgment on the part of the decision-maker.

However, video conferencing has become more commonplace due to the proliferation of camera-equipped devices like smart phones and computers, and the ready availability of off-the-shelf video conferencing software. Many people prefer to communicate using such video conferencing techniques to save the time and expense of traveling for in-person meetings. In the context of a video conference, the scope of view and limited means for authentication can make it difficult for an advisor determine whether the decision-maker is subject to duress or unwillingly participating in a fraud during the video conference.

SUMMARY OF THE INVENTION

Therefore, what is needed are methods and systems to provide secure video conferencing to conduct sensitive financial and legal transactions. The methods and systems described herein provide the advantage of a more-encompassing view of the decision-maker during the video conference, which allows the system to determine whether any other persons (including unauthorized persons) are present during the video conference and may be affecting the transaction process. The methods and systems described herein also provide the advantage of more robust authentication and alerting mechanisms to ensure that any fraudulent or potentially fraudulent transactions are interdicted.

The invention, in one aspect, features a method for secure video conferencing to conduct financial transactions. A server computing device receives a request to establish a video conference from a first client device associated with a user of the first client device. The server computing device authenticates the first client device using credential information. The server computing device establishes a video conference between the first client device and a second client device associated with a customer representative of a financial institution. The server computing device transmits video images associated with one or more cameras coupled to the first client device to the second client device, the video images comprising a view of the user and an area surrounding the user. The server computing device determines whether any persons other than the user are present in the area surrounding the user.

The invention, in another aspect, features a system for secure video conferencing to conduct financial transactions. The system includes a plurality of client devices connected to a server computing device. The server computing device is configured to receive a request to establish a video conference from a first client device associated with a user of the first client device. The server computing device is configured to authenticate the first client device using credential information. The server computing device is configured to establish a video conference between the first client device and a second client device associated with a customer representative of a financial institution. The server computing device is configured to transmit video images associated with one or more cameras coupled to the first client device to the second client device, the video images comprising a view of the user and an area surrounding the user. The server computing device is configured to determine whether any persons other than the user are present in the area surrounding the user.

The invention, in another aspect, features a computer program product, tangibly embodied in a non-transitory computer readable medium, for secure video conferencing to conduct financial transactions. The computer program product includes instructions operable to cause a server computing device connected to a plurality of client devices to receive a request to establish a video conference from a first client device associated with an user of the first client device. The computer program product includes instructions operable to cause the server computing device to authenticate the first client device using credential information. The computer program product includes instructions operable to cause the server computing device to establish a video conference between the first client device and a second client device associated with a customer representative of a financial institution. The computer program product includes instructions operable to cause the server computing device to transmit video images associated with one or more cameras coupled to the first client device to the second client device, the video images comprising a view of the user and an area surrounding the user. The computer program product includes instructions operable to cause the server computing device to determine whether any persons other than the user are present in the area surrounding the user.

Any of the above aspects can include one or more of the following features. In some embodiments, the request to establish a video conference includes the credential information. In some embodiments, the credential information includes an ID number and password entered by the user.

In some embodiments, the one or more cameras coupled to the first client device include a webcam and a camera of a mobile device connected to the first client device. In some embodiments, the webcam is configured to capture video using a panoramic view of the user and the area surrounding the user. In some embodiments, the mobile device camera is configured to capture a side view of the user. In some embodiments, the side view includes at least a portion of the area surrounding the user.

In some embodiments, the server computing device transmits an alert to the second client device if persons other than the user are present in the area surrounding the user. In some embodiments, the alert includes the display of a prompt on the second client device for the customer representative of a financial institution to confirm with the user whether the other persons are authorized to be present. In some embodiments, the server computing device terminates the video conference between the first client device and a second client device if persons other than the user are present in the area surrounding the user.

In some embodiments, a request for approval is displayed on the first client device if persons other than the user are present in the area surrounding the user, prior to terminating the video conference. In some embodiments, the video conference is not terminated if a valid response to the request for approval is provided. In some embodiments, the valid response includes entry of a password by the other person. In some embodiments, the determining step includes determining whether the other persons are exerting influence on the user.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
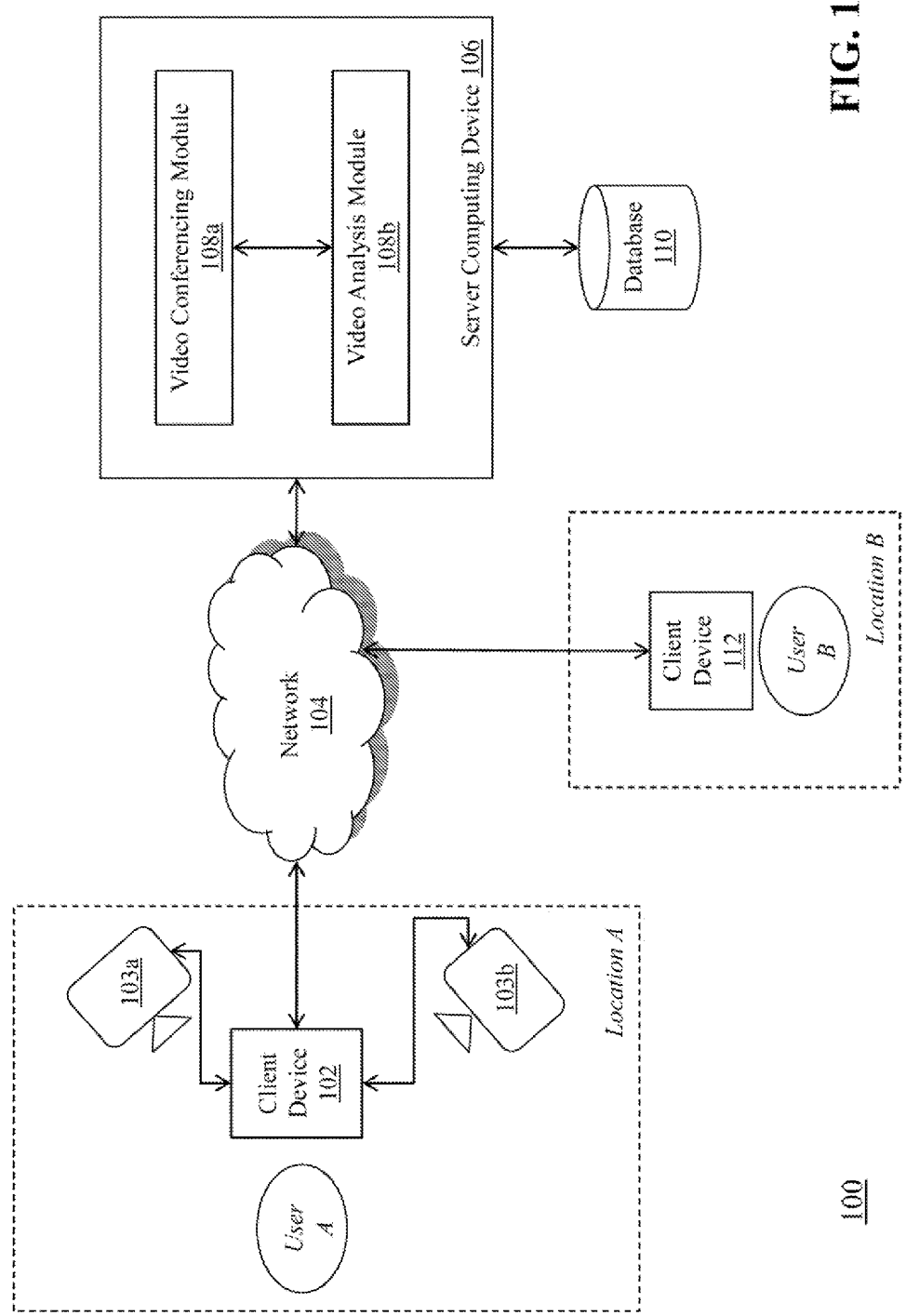
FIG. 1 is a block diagram of a system for secure video conferencing to conduct financial transactions.

FIG. 1 is a block diagram of a system 100 for secure video conferencing to conduct financial transactions, according to an embodiment of the invention. The system 100 includes a plurality of client devices 102 and 112, a plurality of cameras 103a-103b coupled to client device 102, a communications network 104, a server computing device 106 that includes a video conferencing module 108a and a video analysis module 108b, and a database 110.

The plurality of client devices 102, 112 connect to the server computing device 106 via the communications network 104 in order to initiate and participate in video conference calls and other media communication sessions with each other and with other client devices. Exemplary client devices include desktop computers, laptop computers, tablets, mobile devices, smartphones, and internet appliances. It should be appreciated that other types of computing devices that are capable of connecting to the server computing device 106 can be used without departing from the scope of invention. In some embodiments, the client devices 102, 112 are capable of executing video conferencing client software locally and/or using another type of user interface (e.g., a web browser) to connect to the server computing device 106. The video conferencing client software can be open network, free-to-use/ freemium software, such as Skype™ available from Microsoft Corp. of Redmond, Wash. or Google™ Hangouts available from Google, Inc. of Mountain View, Calif., or purchasable, closed network software, such as the RealPresence® platform available from Polycom, Inc. of San Jose, Calif. In some embodiments, the video conferencing client software can be a proprietary platform developed, e.g., by a corporation for use internally and/or with its clients. Although FIG. 1 depicts two client devices 102, 112, it should be appreciated that the system 100 can include any number of client devices.

A plurality of camera devices 103a-103b are coupled to client device 102. The camera devices can be any type of digital video camera (e.g., webcam) that are capable of capturing and transmitting video images of the user (e.g., User A) and/or the client device 102. It should be appreciated that the camera devices 103a-103b are positioned to capture different angles and areas surrounding the user of client device 102. As will be described in greater detail below, the camera devices are configured to capture images of the user and the area surrounding the user for purposes of performing secure financial transactions via video conference. In some embodiments, one or more of the camera devices 103a-103b can be embedded in the client device 102, for example, a smartphone with an integrated camera or a laptop computer with an integrated webcam. Although FIG. 1 depicts two camera devices 103a-103b, it should be understood that the system 100 can include any number of camera devices.

The communication network 104 enables the client devices 102, 112 to communicate with the server computing device 106 in order to initiate and participate in video conference calls and meetings. The network 104 may be a local network, such as a LAN, or a wide area network, such as the Internet and/or a cellular network. In some embodiments, the network 104 is comprised of several discrete networks and/or sub-networks (e.g., cellular Internet) that enable the client devices 102, 112 to communicate with the server computing device 106.

The server computing device 106 is a combination of hardware and software modules that establish, authorize, facilitate and manage video conference calls and meetings between a plurality of client devices 102, 112 and analyze the video images associated with such calls to determine whether there are people in addition to the participants present on the call. The server computing device 106 includes a video conferencing module 108a and a video analysis module 108b. The modules 108a-108b are hardware and/or software modules that reside on the server computing device 106 to perform functions associated with establishing, authorizing, facilitating, and managing video conference calls and meetings, and analyzing the video images associated with such video conferences. In some embodiments, the functionality of the modules 108a-108b is distributed among a plurality of computing devices. It should be appreciated that any number of computing devices, arranged in a variety of architectures, resources, and configurations (e.g., cluster computing, virtual computing, cloud computing) can be used without departing from the scope of the invention. It should also be appreciated that, in some embodiments, the functionality of the modules 108a-108b can be distributed such that any of the modules 108a-108b are capable of performing any of the functions described herein without departing from the scope of the invention. For example, in some embodiments, the functionality of the modules 108a-108b can be merged into a single module.

The video conferencing module 108a can perform a number of different actions to process a video conference call. In some embodiments, the video conferencing module 108a analyzes the signaling and redirects the call to other resources in the system 100 for further processing. For example, the video conferencing module 108a can determine that the inbound call signaling is originating from a client device (e.g., device 102) that is operating a specific video conferencing software platform. Based upon the software platform determination, the video conferencing module 108a can redirect the signaling to a resource in the system that is capable of communicating with the software platform of the client device 102. In some embodiments, the video conferencing module 108a returns a response to the client device 102 that originated the signaling, where the response includes call routing data (e.g., a URI) for the end point device to re-route the signaling.

In some embodiments, the video conferencing module 108a uses the signaling to identify a user of the originating client device 102 and/or the type of client device 102 that originated the signaling. For example, the video conferencing module 108a can utilize data in the signaling, such as the 'to' address, the 'from' address, a device identifier, a user ID, and the like, to determine the identity of a user associated with the originating end point device or the destination end point device. The video conferencing module 108a can access the database 110 to look up details of the user based upon any of the above data points. For example, if the signaling includes a 'to' address, the video conferencing module 108a can search in the database 110 for a user profile associated with the 'to' address. In this way, the video conferencing module 108a maps the signaling to a user and can then leverage its capabilities to customize the video conference experience based upon that user's identity.

In another example, the video conferencing module 108a can use the signaling to determine the technical capability of the client device 102 and adjust the video conferencing features and options available to that client device. The signaling can include a data point that indicates the originating client device 102 has limited network bandwidth for sending and receiving data. The video conferencing module 108a can upgrade or downgrade the fidelity of the video media transmitted to the originating client device 102 based upon the available bandwidth capabilities of the device 102.

In another example, the video conferencing module 108a can use the signaling to determine a user associated with the client device (as described above) and then perform authentication of the client device/user to determine the level of access that the user has on the system 100. For example, the video conferencing module 108a can determine that the user is restricted from establishing video conference calls with a specified list of destinations (e.g., people, devices, physical locations). Based upon the determination of these restrictions, the video conferencing module 108a can evaluate whether to establish the video conference call between the originating client device 102 and the destination end point device specified in the signaling.

The server computing device 106 also includes a video analysis module 108b. The video conference module 108c is coupled to the module 108a. The video analysis module 108b performs functions to analyze the video images transmitted between client devices 102 and 112 during the establishment of a video conference with the primary purpose of determining whether any other persons are present (i.e., in the room with the user at client device 102) during the call, as will be described in greater detail below. The video analysis module 108b can utilize proprietary algorithms and techniques to parse the video images as they are received from the camera devices 103a-103b coupled to the client device 102 and determine the presence of other persons. In some embodiments, the video analysis module 108b performs its analysis in substantially real time to provide a secure, safe channel for sensitive communications (such as financial transactions) between the user at client device 102 and the representative at client device 112.

The system 100 also includes a database 110. The database 110 is coupled to the server computing device 106 and stores data used by the server computing device 106 to perform the video conferencing and video analysis functionality. The database 110 can be integrated with the server computing device 106 or be located on a separate computing device. An example database that can be used with the system 100 is MySQL™ available from Oracle Corp. of Redwood City, Calif.

Figure 2:
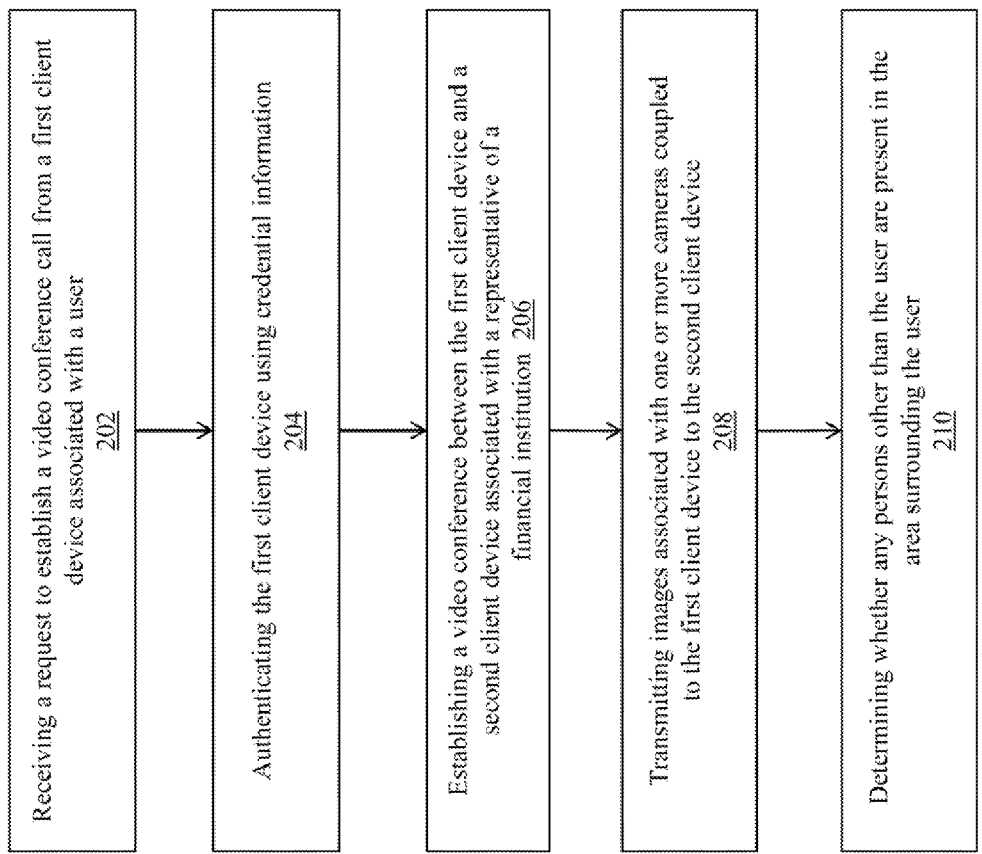
FIG. 2 is a flow diagram of a method for secure video conferencing to conduct financial transactions.

FIG. 2 is a flow diagram of a method 200 for secure video conferencing to conduct financial transactions, using the system 100 of FIG. 1. The video conferencing module 108a of the server computing device 106 receives (202) a request to establish a video conference call from a first client device 102 associated with a user (e.g., User A in FIG. 1). For example, the user at client device 102 may be a customer of a financial institution and may wish to perform a transaction associated with his or her account(s) at the financial institution. The user can log into the financial institution's web site using software on client device 102 and, e.g., press a button to initiate a video conference call with a customer service representative. The client device 102 then transmits the video conference call request to server computing device 106.

The video conferencing module 108b authenticates (204) the client device 102 using credential information. For example, when the user logged into the financial institution's web site, the login credentials can be stored and used to authenticate the user and/or the client device 102 with the server 106. As described previously, the client device 102 and/or the server computing device 106 can request additional credential information from the user before proceeding to establish a video conference call. Credential information can include, but is not limited to, username, password, biometric information, tokens, public/private key information, security certificates, device-specific info (such as a device footprint, serial number, and the like). It should be appreciated that other types of authentication methods and techniques can be used without departing from the scope of the invention described herein.

The video conferencing module 108a establishes (206) a video conference between the client device 102 and the client device 112, where client device 112 is associated with a representative of the financial institution. As set forth above, the user at client device 102 can establish a video conference with his or her advisor (e.g., brokerage rep) at the financial institution. The server 106 can notify the advisor that an incoming video conference request has been received and, in some embodiments, identify the user that has initiated the request. In addition, the server computing device 106 can retrieve additional information about the user and/or the user's portfolio from database 110 to provide the advisor with information that may be useful during the video conference. For example, the server computing device 106 can inform the advisor of the reason for the user's call (e.g., to transfer funds, to change beneficiary information).

Upon establishing the video conference between devices 102 and 112, the video conferencing module 108a transmits (208) images associated with one or more of the camera devices 103a-103b coupled to the client device 102 to the client device 112 associated with the advisor. The advisor can use the client device 112 to view the video images provided by the camera devices 103a-103b. In some embodiments, the client device 112 is coupled to a camera device (not shown) that allows the customer representative at client device 112 to transmit video images of him to the user at client device 102.

Figure 3A:
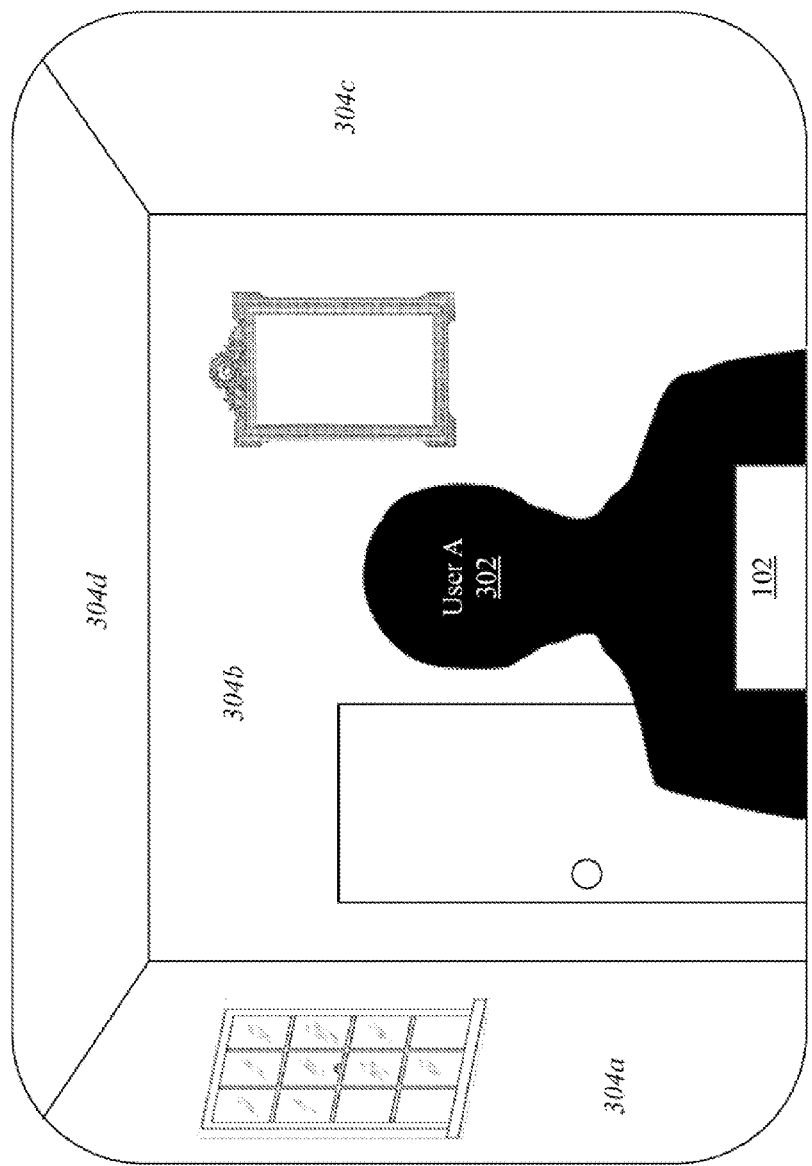
FIGS. 3A and 3B are diagrams of exemplary images captured by one or more of the camera devices coupled to a client device during a video conference call.

The video analysis module 108b at server computing device 106 determines (210) whether any persons other than the user are present in the area surrounding the user. FIG. 3A is a diagram of an exemplary image captured by one or more of the camera devices 103a-103b coupled to client device 102 during a video conference call between client device 102 and client device 112. As shown in FIG. 3A, the user 302 (e.g., User A from FIG. 1) is depicted sitting in front of client device 102. The areas surrounding the user 302 can be seen in the image: a side wall 304a that includes a window, a back wall 304b that includes a door and a mirror, the other side wall 304c, and the ceiling 304d. In some embodiments, the image captured by one or more of the camera devices 103a-103b is a panoramic view of the user and the area surrounding the user.

The video analysis module 108b of server computing device 106 receives the video images from client device 102 and analyzes the images as they are sent to client device 112 associated with the advisor. For example, the video analysis module 108b can use techniques such as motion detection algorithms, facial detection algorithms, shape analysis algorithms, and the like to determine the presence of any persons in the images. In the example of FIG. 3A, the video analysis module 108b can determine that user 302 is present in the image. In some embodiments, the video analysis module 108b can utilize facial recognition technology to determine the identity of user 302 and confirm that the user is authorized to participate in the video conference call and/or matches the credential information provided earlier.

In some embodiments, the module 108b can analyze selected images from the video conference to determine whether additional persons are present during the conference. For example, the video analysis module 108b can review images captured by the camera devices 103a-103b at intervals of, e.g., a few seconds instead of all of the images that are captured by devices 103a-103b. This technique can improve processing efficiency and reduce latency of the video conference call.

Figure 3B:
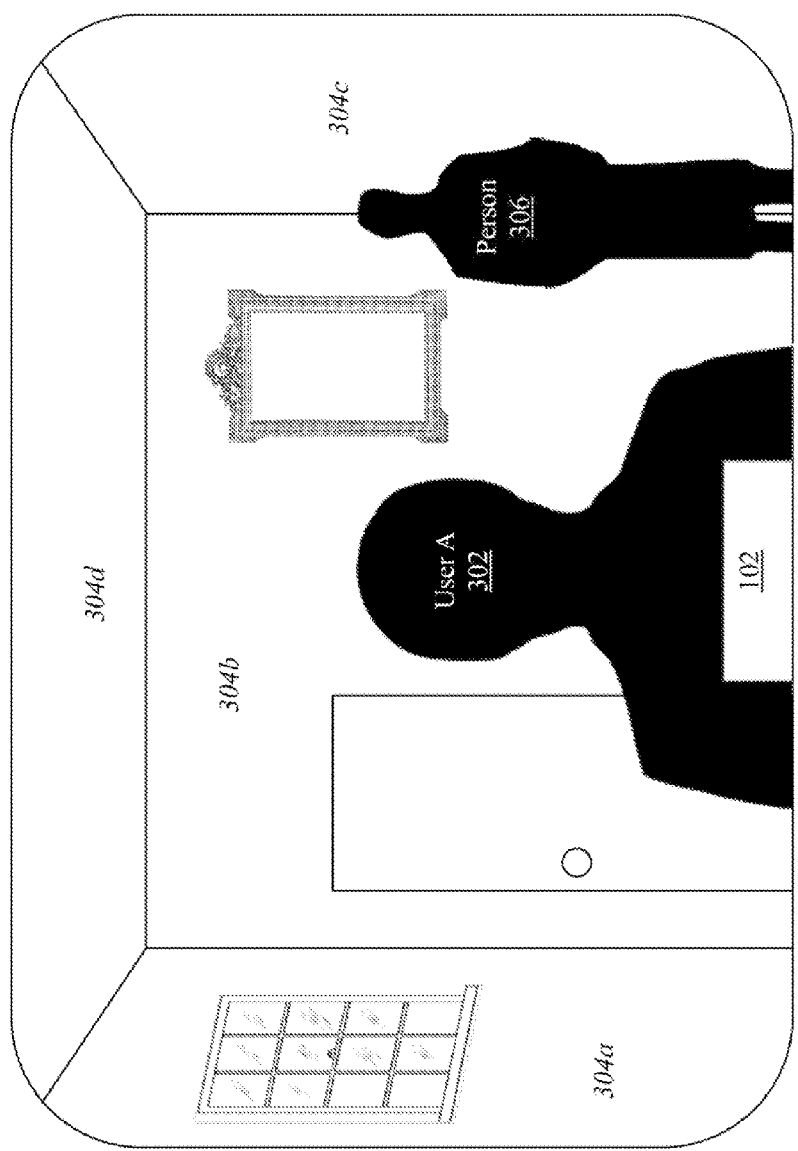

FIG. 3B is a diagram of an exemplary image captured by one or more of the camera devices 103a-103b coupled to client device 102 during a video conference call between client device 102 and client device 112. As shown in FIG. 3B, the user 302 is still present at client device 102, and the areas surrounding user 302 (including walls 304a, 304b, 304c and ceiling 304d) are still visible. However, another person 306 has appeared in the video image.

The video analysis module 108b detects the presence of person 306 as described above. The video analysis module 108b can perform a number of different actions upon detecting the presence of another person:

Issue an alert to the client device 112 of the advisor—the module 108b can transmit an alert message to be displayed to the advisor at client device 112. For example, the alert may inform the advisor that another person 306 has been detected in proximity to user 302. In some embodiments, the alert can prompt the advisor as to whether he or she should verify the identity of the person 306 before continuing with the video conference. In some embodiments, the alert can ask the advisor whether the video conference should be terminated immediately.

Issue an alert to the client device 102 of the user 302—the module 108b can transmit an alert message to be displayed to the user 302 at client device 102. For example, the alert may inform the user 302 that another person 306 has been detected in proximity to user 302. In some embodiments, the alert can prompt the user 302 as to whether the identity of the person 306 should be verified before continuing with the video conference. For example, perhaps person 306 is the spouse of user 302, and user 302 has provided the financial institution with information that can be used to authenticate person 306 during video conference calls. The module 108b can request authentication credentials from person 306 before the video conference will resume. In some embodiments, the alert can ask the user 302 whether the video conference should be terminated immediately or whether the user 302 wishes to proceed with the video conference even though person 306 is in the room. In some cases, however, it may not be desirable to issue an alert to the client device 102—for example, an alert may warn the person 306 that the system 100 is taking action based upon his or her presence.

Interdict transactions performed during the video conference call—the module 108b can stop any transactions performed by the user during the video conference call from being executed, e.g., until separate authorization is received from the user 302. For example, upon detecting the presence of person 306, the module 108b can flag any transactions performed by user 302 (e.g., transfer money orders) during the video conference call as "do not execute." Although the transactions are not being executed at the time the user initiates them, the user 302 is not aware that anything about the transaction process has changed. The financial institution's system still represents to the user 302 that his or her transactions were processed successfully—so that if the person 306 is exerting undue influence on the user 302 in an attempt to execute a fraudulent transaction, the person 306 does not realize that the transaction is not complete. In some embodiments, the financial institution can issue a confirmation request to the user 302 via a separate channel (e.g., email, phone, mail) that asks the user 302 to confirm that the transactions performed during the video conference should indeed be finalized.

Perform identification analysis techniques to ascertain the identity of the person 306—as described previously, the module 108b can utilize facial recognition techniques to determine the identity of person 306 and whether that person is authorized to be present during the video conference call.

Figure 3C:
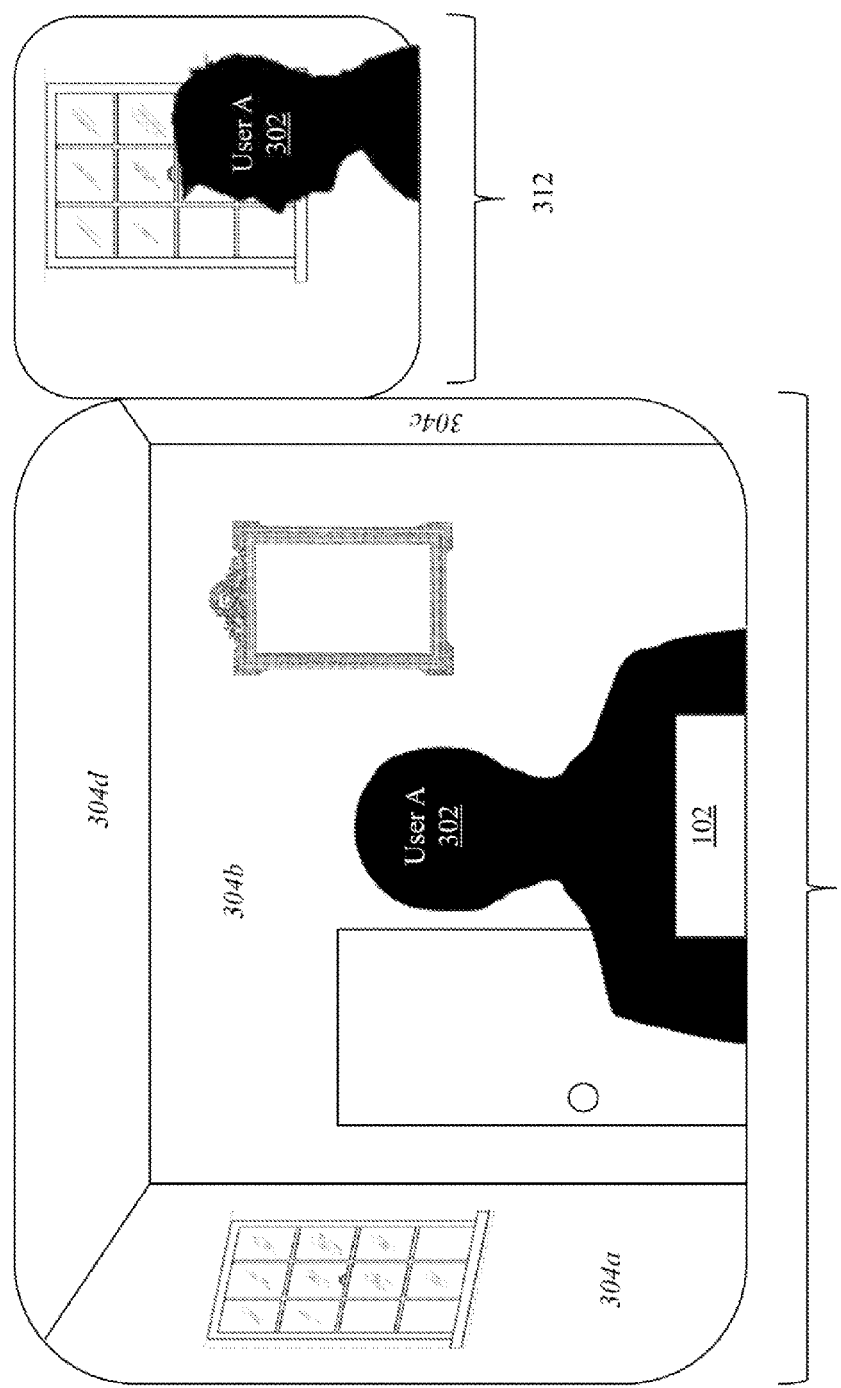
FIGS. 3C and 3D are diagrams of exemplary images captured by one or more of the camera devices coupled to a client device during a video conference call, including a side view.

FIG. 3C is a diagram of exemplary images captured by a plurality of the camera devices 103a-103b coupled to client device 102 during a video conference call between client device 102 and client device 112. As shown in FIG. 3C, the main image 310 depicts that the user 302 is present at client device 102, and the areas surrounding user 302 (including walls 304a, 304b, 304c and ceiling 304d) are still visible. FIG. 3C includes an auxiliary image 312 that depicts the user 302 from another angle (e.g., a side profile view). The auxiliary image 312 captures the area surrounding the user 302, including the side wall 304a and window.

Figure 3D:
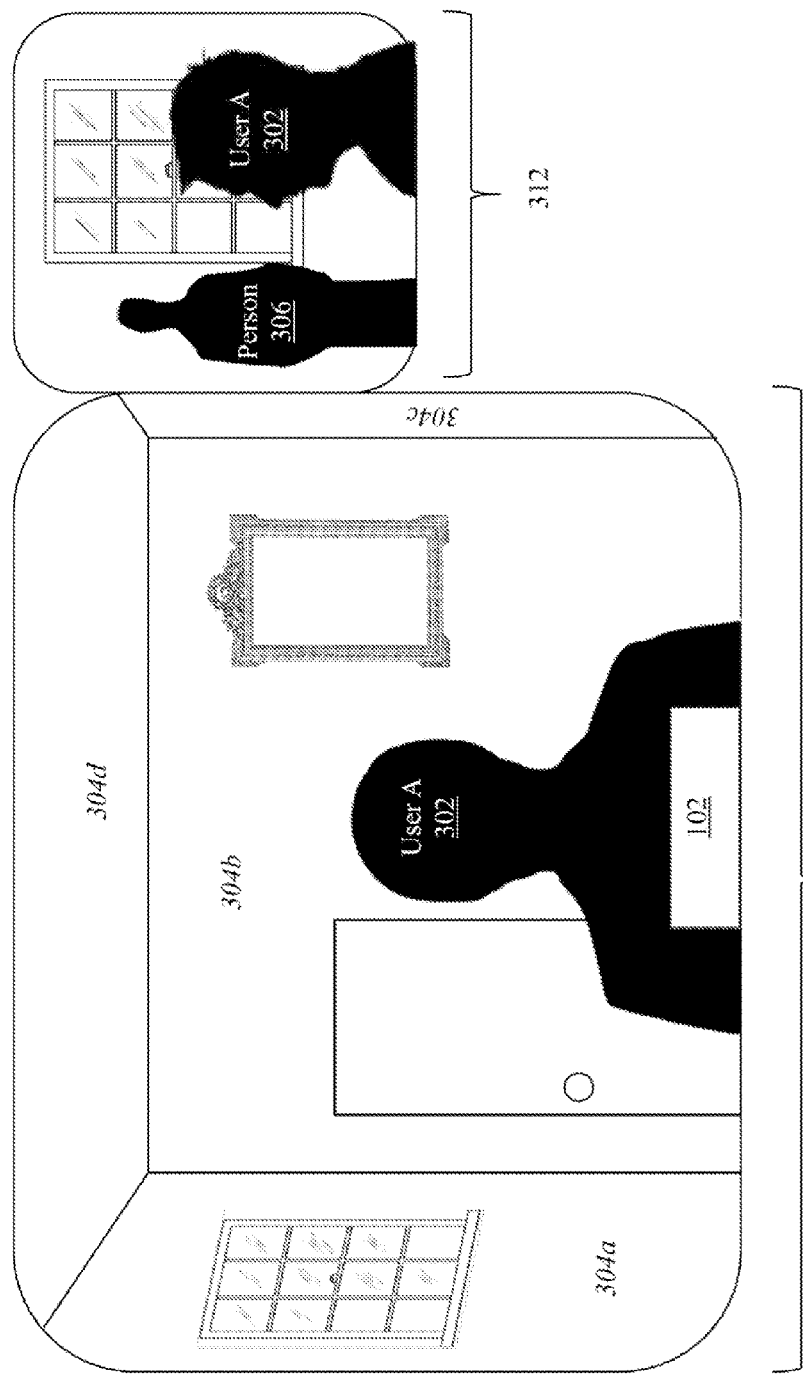

FIG. 3D is a diagram of exemplary captured by a plurality of the camera devices 103a-103b coupled to client device 102 during a video conference call between client device 102 and client device 112. As shown in FIG. 3D, the main image 310 depicts that the user 302 is still present at client device 102, and the areas surrounding user 302 (including walls 304a, 304b, 304c and ceiling 304d) are still visible. No additional persons appear to be present in the room based upon the main image. However, the auxiliary image 312 shows that another person 306 is present in the room. In this manner, the methods and systems described herein can be configured to capture a complete view (e.g., 360 degrees) of the user 302 to ensure that all persons in proximity to the user 302 are accounted for. In some embodiments, the camera devices 103a-103b periodically move around (e.g., pan, tilt) to cover a more comprehensive area of the room than a stationary camera device at the same location.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for secure video conferencing to conduct financial transactions, the method comprising:
   receiving, by a server computing device, a request to establish a video conference from a first client device associated with a user;
   authenticating, by the server computing device, the first client device using credential information;
   establishing, by a server computing device, a video conference between the first client device and a second client device associated with a representative of a financial institution;
   transmitting, by the server computing device, images associated with one or more cameras coupled to the first client device to the second client device, the images comprising a view of the user and an area surrounding the user;
   determining, by the server computing device, whether any person other than the user is present in the area surrounding the user; and
   transmitting, by the server computing device, an alert to the second client device if a person other than the user is present in the area surrounding the user, wherein the alert includes display of a prompt on the second client device for the representative to confirm with the user whether the person other than the user is authorized to be present.

2. The method of claim 1, wherein the request to establish a video conference includes the credential information.

3. The method of claim 2, wherein the credential information includes an ID number and password entered by the user.

4. The method of claim 1, wherein the one or more cameras coupled to the first client device include a webcam and a camera of a mobile device connected to the first client device.

5. The method of claim 4, wherein the webcam is configured to capture video using a panoramic view of the user and the area surrounding the user.

6. The method of claim 4, wherein the mobile device camera is configured to capture a side view of the user.

7. The method of claim 6, wherein the side view includes at least a portion of the area surrounding the user.

8. The method of claim 1, further comprising terminating, by the server computing device, the video conference between the first client device and a second client device if a person other than the user is present in the area surrounding the user.

9. The method of claim 8, further comprising displaying a request for approval on the first client device if a person other than the user is present in the area surrounding the user, prior to terminating the video conference.

10. The method of claim 9, wherein the video conference is not terminated if a valid response to the request for approval is provided.

11. The method of claim 10, wherein the valid response includes entry of a password by the person other than the user.

12. The method of claim 1, wherein the determining step includes determining whether the person other than the user is exerting influence on the user.

13. A system for secure video conferencing to conduct financial transactions, the system comprising:
   a plurality of client devices connected to a server computing device, the server computing device configured to:
      receive a request to establish a video conference from a first client device associated with an user of the first client device;
      authenticate the first client device using credential information;
      establish a video conference between the first client device and a second client device associated with a representative of a financial institution;
      transmit video images associated with one or more cameras coupled to the first client device to the second client device, the video images comprising a view of the user and an area surrounding the user;
      determine whether any person other than the user is present in the area surrounding the user; and
      transmit an alert to the second client device if a person other than the user is present in the area surrounding the user, wherein the alert includes display of a prompt on the second client device for the representative to confirm with the user whether the person other than the user is authorized to be present.

14. The system of claim 13, wherein the request to establish a video conference includes the credential information.

15. The system of claim 14, wherein the credential information includes an ID number and password entered by the user.

16. The system of claim 13, wherein the one or more cameras coupled to the first client device include a webcam and a camera of a mobile device connected to the first client device.

17. The system of claim 16, wherein the webcam is configured to capture video using a panoramic view of the user and the area surrounding the user.

18. The system of claim 16, wherein the mobile device camera is configured to capture a side view of the user.

19. The system of claim 18, wherein the side view includes at least a portion of the area surrounding the user.

20. The system of claim 13, wherein the server computing device is further configured to terminate the video conference between the first client device and a second client device if a person other than the user is present in the area surrounding the user.

21. The system of claim 20, wherein the server computing device is further configured to display a request for approval on the first client device if a person other than the user is present in the area surrounding the user, prior to terminating the video conference.

22. The system of claim 21, wherein the video conference is not terminated if a valid response to the request for approval is provided.

23. The system of claim 22, wherein the valid response includes entry of a password by the person other than the user.

24. The system of claim 13, wherein the determining step includes determining whether the person other than the user is exerting influence on the user.

25. A computer program product, tangibly embodied in a non-transitory computer readable medium, for secure video conferencing to conduct financial transactions, the computer program product including instructions operable to cause a server computing device connected to a plurality of client devices to:
   receive a request to establish a video conference from a first client device associated with an user of the first client device;

authenticate the first client device using credential information;
establish a video conference between the first client device and a second client device associated with a representative of a financial institution;
transmit video images associated with one or more cameras coupled to the first client device to the second client device, the video images comprising a view of the user and an area surrounding the user;
determine whether any person other than the user is present in the area surrounding the user; and
transmit an alert to the second client device if a person other than the user is present in the area surrounding the user, wherein the alert includes display of a prompt on the second client device for the representative to confirm with the user whether the person other than the user is authorized to be present.

* * * * *